J. W. CARMAN.
AUTOMOBILE SIGNAL.
APPLICATION FILED APR. 4, 1919.
1,323,448.
Patented Dec. 2, 1919.
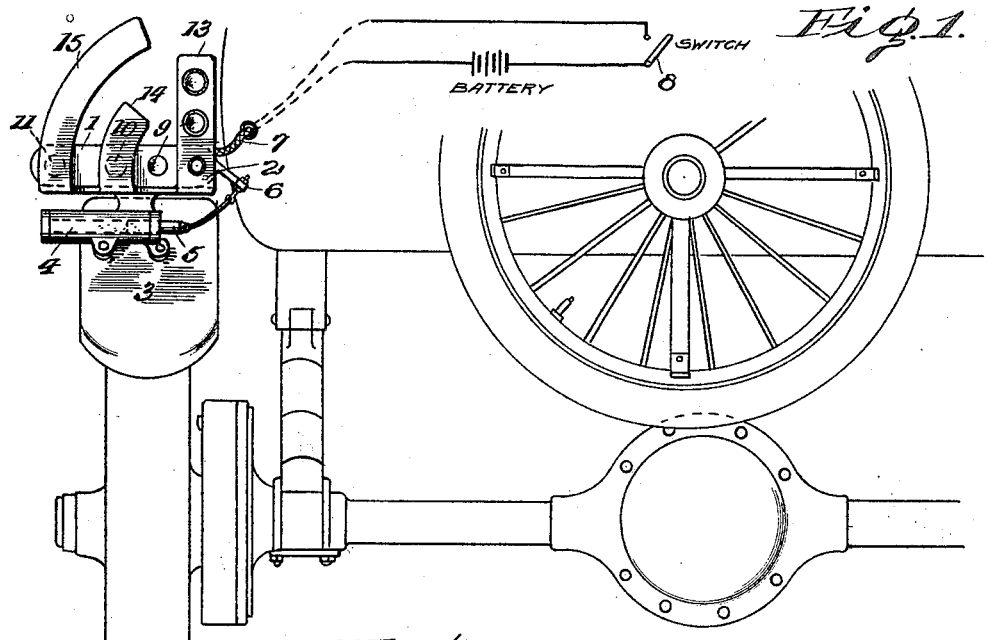
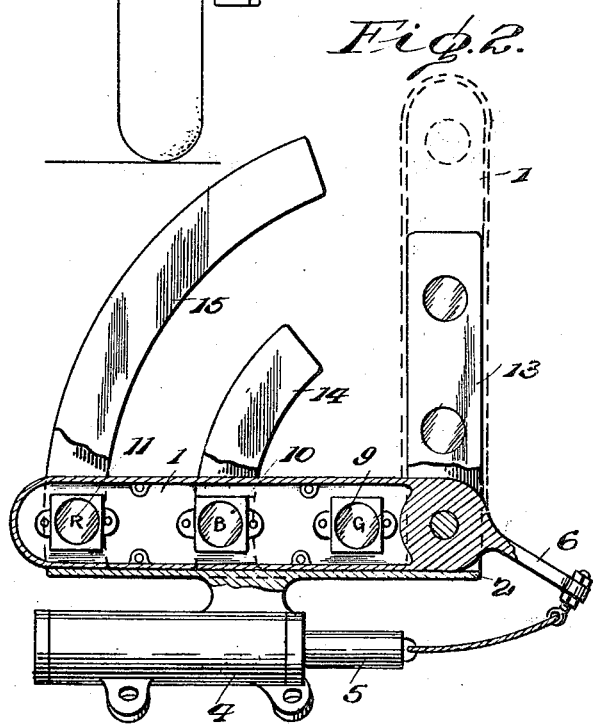
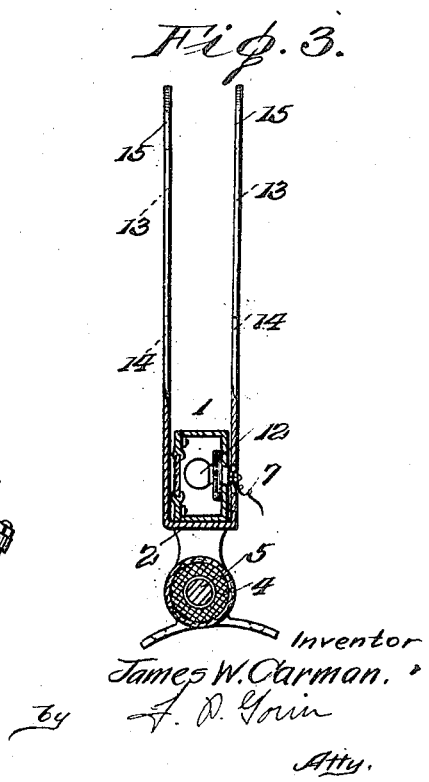
Inventor
James W. Carman.
by
Atty.

UNITED STATES PATENT OFFICE.

JAMES W. CARMAN, OF SEATTLE, WASHINGTON.

AUTOMOBILE-SIGNAL.

1,323,448.  Specification of Letters Patent.  Patented Dec. 2, 1919.

Application filed April 4, 1919. Serial No. 287,403.

*To all whom it may concern:*

Be it known that I, JAMES W. CARMAN, a citizen of the United States, residing at Seattle, in the county of King and State of Washington, have invented certain new and useful Improvements in Automobile-Signals, of which the following is a specification.

This invention relates to an improvement in signals for automobiles, in the use of which the driver of the automobile may indicate a contemplated action as stopping or turning, to thereby notify following and other vehicles of such intention.

The invention, generally stated, comprises a movable arm or semaphore-like arm adapted to be moved from a horizontal position, to vertical position, with signal indicating characteristics, such as different color lenses, successively exposed during the movement of the arm from horizontal to vertical positions.

In the drawings:—

Figure 1 is an elevation of the rear portion of an automobile showing the improved signal applied to one of the rear fenders.

Fig. 2 is an enlarged elevation of the signal with the signal arm in horizontal position in full lines, and in vertical position in dotted lines.

Fig. 3 is a cross sectional view of the signal structure.

The improved signal is illustrated as comprising a semaphore arm 1, pivotally supported on a bracket 2, which latter is secured to the fender 3 of an automobile, so that in horizontal position the arm 1 extends across and substantially parallel to the fender.

The arm is moved to a vertical position by energizing solenoid 4, supporting bracket 2 intermediate its ends, and having the core 5 thereof connected to a projection 6 of the arm, so that upon energization of the solenoid the arm will be pulled to the vertical position. The solenoid 4 is preferably controlled by a circuit, as 7, having a switch 8 therein and arranged within convenient reach of the driver, as will be obvious.

The semaphore arm 1 is provided with a series, in this instance three lenses, as 9, 10 and 11, and these lenses are differently colored, for example the lens 9, adjacent the pivotal mounting arm may be green, the next lens 10 may be blue, and the remaining lens 11, which is the lens adjacent the free end of the arm, is preferably red. Mounted upon the fender in comparatively close proximity, and in rear of such arm with respect to the contemplated signaling operation, is a means for illumination, here shown as a small incandescent bulb 12, energizing in any suitable manner.

Mounted on the fender, or it may be on a base for the signal proper, and on that side of the arm 1 which may be said to be the signaling side, are shutters 13, 14 and 15. These shutters are respectively arranged in such relative positions to the lenses 9, 10 and 11, that when the semaphore arm is in a horizontal position, the lens 9, that is the green lens will be visible in the opening between shutters 13 and 14, while the lenses 10 and 11 will be entirely cut off by the shutters 14 and 15. Therefore the light shining through the lens 9, will display the universally understood green signal.

To indicate a contemplated turn in the direction of the vehicle, the driver energizes the solenoid 4, and thereby moves the arm 1 to the vertical position. The shutter 13 is so arranged relatively to the lens 9 that following the initial movement of the arm 1 toward the vertical position, the green signal is moved behind to shutter 13, while, by reason of the peculiar arrangement of the shutter 14 with respect to the lens 10, said lens will move from behind the shutter, as the lens 9 is concealed, to thereby display the blue signal for a short interval. As the blue signal or lens disappears behind the shutter 13, the lens 11, or red signal rides from the rear of its shutter 15, and remains permanently displayed, as long as the arm 1 is in vertical position.

Of course this signal light herein referred to may be varied to suit conditions, the reference given being merely for convenient description.

It will thus be apparent that in the use of the signal there is continually exposed a "clear" signal when the device is in horizontal position, and also continually exposed a "danger" signal when the arm is in vertical position. Furthermore in the change from the clear to the danger signals there is temporarily exposed a distinctive signal which acts in a most positive manner, to direct even the attention of the most careless driver of a following car to the fact that a signal is being made.

It is contemplated that a signaling device be arranged on each rear fender, and if desired the semaphore arm may be marked "right" and "left" and used properly in accordance with such marking to indicate direction of turning. Any and all additional signaling indications may be used in connection with the device described, so long as the characteristic feature of distinctive flash between signaling positions is used.

What I claim is:—

1. An automobile signal comprising a semaphore arm mounted for swinging movement, means for causing such movement, a plurality of distinctive signaling means carried by the arm, means for concealing all such signaling means other than a predetermined one when the arm is in horizontal position, said means providing for a temporary display of one of such concealed signaling means and a final display of another of such signaling means in the movement of the arm to vertical position.

2. An automobile signaling means comprising a semaphore arm having a plurality of different colored lenses, a means for illumination for all of said lenses, means for moving the arm from a horizontal to vertical position, and shutters arranged beyond the lenses with respect to the illuminating means and constructed to cover all of said lenses but one when the arm is in horizontal position, to permit a temporary display of another of said lenses while the arm is moving to vertical position, and to permit a final display of another of said lenses when the arm is in vertical position.

3. An automobile signaling device comprising a semaphore arm adapted to be moved from one position to another for signaling purposes, said arm providing an indicating signaling means in each of said positions, and having an additional signaling means temporarily displayed while the arm is moving from one position to the other.

4. An automobile signaling device comprising a semaphore arm adapted to be moved from one position to another for signaling purposes, said arm providing an indicated signaling means in each of said positions, and having an additional signaling means temporarily displayed while the arm is moving from one position to the other, the indicating signaling means being concealed during the display of the temporary signaling means.

In testimony whereof I affix my signature.

JAMES W. CARMAN.